United States Patent [19]

Erlichman

[11] 4,196,987

[45] Apr. 8, 1980

[54] MULTIPLE MODE EXPOSURE CONTROL SYSTEM WITH GRAY CODE APERTURE SELECTOR

[75] Inventor: Irving Erlichman, Wayland, Mass.

[73] Assignee: Polaroid Corporation, Cambridge, Mass.

[21] Appl. No.: 939,422

[22] Filed: Sep. 5, 1978

[51] Int. Cl.² .............................................. G03B 7/08
[52] U.S. Cl. .................................. 354/23 D; 354/27; 354/29; 354/149
[58] Field of Search .................. 354/139, 149, 27, 29, 354/30, 23 D

[56] References Cited

U.S. PATENT DOCUMENTS

| | | | |
|---|---|---|---|
| 3,526,181 | 9/1970 | Fahlenberg et al. | 354/23 D X |
| 3,570,381 | 3/1971 | Satoo | 354/60 R X |
| 3,709,137 | 1/1973 | Starp | 354/23 D X |
| 3,928,858 | 12/1975 | Sakurada et al. | 354/29 X |
| 3,945,025 | 3/1976 | Stempeck | 354/29 |
| 3,950,776 | 4/1976 | Erlichman et al. | 354/29 |
| 3,969,735 | 7/1976 | Nobusawa | 354/29 |
| 3,977,012 | 8/1976 | Erlichman | 354/29 |
| 4,016,574 | 4/1977 | Iwata et al. | 354/29 |
| 4,023,187 | 5/1977 | Shenk | 354/27 |
| 4,058,816 | 11/1977 | Nobusawa | 354/23 D |
| 4,065,776 | 12/1977 | Iwata et al. | 354/23 D |

OTHER PUBLICATIONS

U.S. Appl'n. S.N. 898,546, filed Apr. 21, 1976 by Conrad Biber et al.
U.S. Appl'n. S.N. 930,029 filed Aug. 1, 1978 by Irving Erlichman.
U.S. Appl'n. S.N. 899,785 filed Apr. 25, 1978 by Edwin Shenk.

Primary Examiner—Michael L. Gellner
Attorney, Agent, or Firm—John S. Vale

[57] ABSTRACT

An exposure control system being selectively operable in a plurality of ambient and flash illumination modes of operation. The operator may program the system for a selected one of the modes by setting a corresponding programming combination of two mode selecting switches, one of which is preferably rendered conductive in response to operatively coupling a flash source to a receiving socket thereby indicating the selection of flash mode operation. The system features a pair of shutter/aperture blades adapted to be driven stepwise by a stepper motor and an aperture selecting system that provides a Gray coded binary number indicating the number of steps the blades are to be driven for a particular exposure. In the flash modes, the Gray coded number is provided in response to lens focusing to provide a Gray coded number corresponding to a scene distance related range of exposure aperture values. In at least one of the ambient light modes the aperture selecting system is configured to be set manually by the operator to provide an aperture indicating Gray coded number that is selected independently of lens focus distance.

5 Claims, 7 Drawing Figures

| STEP NUMBER | TRACK POSITION | GRAY CODE BINARY NUMBER | | | | |
|---|---|---|---|---|---|---|
| | | 5 | 4 | 3 | 2 | 1 |
| 0 | | 0 | 0 | 0 | 0 | 0 |
| 1 | | 0 | 0 | 0 | 0 | 1 |
| 2 | | 0 | 0 | 0 | 1 | 1 |
| 3 | | 0 | 0 | 0 | 1 | 0 |
| 4 | | 0 | 0 | 1 | 1 | 0 |
| 5 | | 0 | 0 | 1 | 1 | 1 |
| 6 | | 0 | 0 | 1 | 0 | 1 |
| 7 | | 0 | 0 | 1 | 0 | 0 |
| 8 | | 0 | 1 | 1 | 0 | 0 |
| 9 | | 0 | 1 | 1 | 0 | 1 |
| 10 | | 0 | 1 | 1 | 1 | 1 |
| 11 | | 0 | 1 | 1 | 1 | 0 |
| 12 | | 0 | 1 | 0 | 1 | 0 |
| 13 | | 0 | 1 | 0 | 1 | 1 |
| 14 | | 0 | 1 | 0 | 0 | 1 |
| 15 | | 0 | 1 | 0 | 0 | 0 |
| 16 | | 1 | 1 | 0 | 0 | 0 |
| 17 | | 1 | 1 | 0 | 0 | 1 |
| 18 | | 1 | 1 | 0 | 1 | 1 |
| 19 | | 1 | 1 | 0 | 1 | 0 |
| 20 | | 1 | 1 | 1 | 1 | 0 |
| 21 | | 1 | 1 | 1 | 1 | 1 |
| 22 | | 1 | 1 | 1 | 0 | 1 |
| 23 | | 1 | 0 | 1 | 0 | 0 |
| 24 | | 1 | 0 | 1 | 0 | 0 |

FIG. 5

MULTIPLE MODE EXPOSURE CONTROL SYSTEM WITH GRAY CODE APERTURE SELECTOR

BACKGROUND OF THE INVENTION

1. Field of the Invention

The present invention relates to the field of photography and, more specifically, to exposure control systems used in photographic apparatus and being configured for multiple ambient and flash illumination modes of operation.

2. Description of the Prior Art

The present invention relates to exposure control systems having one or more shutter and/or exposure aperture blades that are configured to be reversibly driven, stepwise, between terminal positions by an electrically controlled driver, such as an electrical stepper motor, for regulating the transmission of image forming light rays from a scene to be photographed along an optical path to a film unit located at the focal plane of a photographic apparatus such as a camera.

In general, such exposure control systems operate automatically or semiautomatically in both ambient and flash illumination modes of operation. For example, U.S. Pat. No. 3,950,766 and copending application Ser. No. 930,029 are directed to automatic exposure control systems wherein a stepper motor driven shutter is operated automatically in the ambient illumination mode under the control of a light integrating circuit that monitors the brightness of scene illumination and also operate automatically in the flash illumination mode wherein a follow focus system is utilized to select an optimum exposure aperture value in accordance with scene range distance as defined by the distance at which the objective lens is focused. U.S. Pat. No. 3,977,012 discloses a stepper motor driven shutter which operates in a semi-automatic mode wherein the operator manually sets exposure value in accordance with a photometer reading that is indicative of scene illumination brightness. These two patents and the copending application are assigned in common with the present application.

U.S. Pat. No. 4,065,776 is directed to an automatic exposure control system in which the stepper motor shutter is operated under the control of a scene light integrating circuit in the ambient light mode and utilizes a follow focus system for flash operation in which the lens focusing ring of the camera is coupled to a variable resistor so that the distance to the scene may be converted into a corresponding resistance value that is in the stepping motor control circuit for electrically regulating the shutter exposure aperture value in accordance with subject distance. In one embodiment the flash system operates in the follow focus mode wherein the exposure interval is fixed by an R-C circuit without regard for the effect of ambient light on scene illumination. In another embodiment the flash system operates in a hybrid mode wherein a photocell circuit monitors scene lighting and the exposure interval is determined by a combination of the follow focus set aperture value and the total scene brightness as defined by both the flash and ambient illumination.

While it is well known in the prior art to provide exposure control systems that feature stepper motor driven shutter and/or aperture mechanisms that operate in particular ambient and flash illumination modes of operation, including automatic, semiautomatic or manual setting modes, in general these systems do not provide the operator with the option to select among a plurality of ambient and flash illumination modes so that he may selectively override the automatic operation to exert some degree of creative or personal preference control over the photographic exposure or more closely optimize the exposure parameters for different types of flash illumination sources (i.e., incandescent flash bulbs vs. electronic strobe light).

Therefore it is a feature and object of the present invention to provide an exposure control system of the type wherein the shutter and/or aperture blade mechanism is driven stepwise by a driver such as a stepper motor and the system is programmable by the operator to operate in a plurality of ambient illumination modes and a plurality of flash illumination modes so that the operator may exert some personal preference control over the photographic exposure.

It is another object to provide such an exposure control system that is simple in construction and provides the operator with the choice of fully automatic or semiautomatic ambient illumination modes wherein the operator, under at least certain lighting conditions, may select the maximum exposure aperture to control depth of focus in the resultant photographic image when the system is operated in the semiautomatic ambient mode and also may select between a first flash mode wherein the shutter aperture blade mechanism is selectively programmed to operate in conjunction with an incandescent flash bulb source of relatively long duration and a second flash mode wherein the blade mechanism is preferentially programmed for operation with an electronic strobe flash source.

Another object is to provide such an exposure control system wherein the system may be set for selecting one of four possible modes of operation by the manipulation of only two switching devices that may be selectively set in any one of four possible combinations.

Yet another object of the present invention is to provide an exposure control system wherein digitally coded information, that sets the number of discrete steps that a shutter/aperture blade mechanism will be displaced by the stepper motor, from the closed position during an exposure interval, will be provided to the system's control logic circuitry in an unambiguous form, preferably in the form of binary coded numbers arranged in accordance with the Gray Code.

Other objects of the invention will in part be obvious and will in part appear hereinafter.

SUMMARY OF THE INVENTION

The present invention provides an exposure control system, being selectively operable in each of a plurality of ambient illumination modes and a plurality of flash illumination modes, for regulating the transmission of image forming light rays from a scene to be photographed along an optical path to a photographic film unit located at a given focal plane of a photographic apparatus.

The system comprises a blade mechanism including a plurality of blades being mounted for displacement between closed and fully opened positions, resectively blocking and unblocking the optical path, and cooperating to provide progressively changing exposure aperture values in response to progressive displacement between these two positions. The blades are adapted to be driven stepwise by energizable drive means, preferably a stepper motor, from the closed position to the fully open position and then back to the closed position in a given number of substantially equally spaced and timed steps. The drive means is responsive to opening energizing signals for driving the blade towards the fully opened position, closing energizing signals for driving the blades towards the closed position and serves to interrupt displacement of the blades when the drive means is deenergized. The system components associated with flash illumination operation include means, such as a socket, for operatively receiving a source of flash illumination and a flash firing system for firing an operatively coupled source.

In order to provide the operator with the option of selecting among a plurality of modes of operation, the exposure control system includes a control subsystem which the operator may selectively program for each of the plurality of ambient and flash illumination modes of operation for controlling the operation of the drive means and the flash firing system in accordance with the selected mode. The control subsystem includes (1) means for providing opening and closing energizing signals for the driver and for selectively deenergizing the same, (2) adjustable means being selectively operable for controlling the number of steps the blades are initially displaced from the closed position so as to select a range of exposure values for a given film exposure, and (3) means for initiating operation of the flash firing system in accordance with a selected flash mode of operation and a range of exposure values selected therefor. The operator is able to select an appropriate mode by utilizing a mode selector system that is effective to program the control system for a selected one of the plurality of ambient and flash illumination modes. The mode selecting system includes a manual switchable arrangement being switchable between a plurality of different mode selecting positions and providing a different first programming input for each position and a second switching arrangement for indicating the presence or absence of an operatively coupled flash source and for providing different second programming inputs for each of these two conditions. When a first and second programming input are applied in combination to the control subsystem, it is programmed for a selected one of the plurality of modes of operation corresponding to each combination of the different first and second programming inputs.

In a preferred embodiment the mode selecting system includes a manually actuable first switch that is movable by the operator between on and off positions and a second switch which is in a nonconducting or off state when there is no flash source in the receiving socket and is turned on in response to a source of flash illumination being operatively coupled to the receiving socket.

By using the on and off conditions of the first and second switches as mode programming logic inputs, the two switches may be set in four possible combinations that are used to program the exposure control system for two ambient light modes (fully automatic and semi-automatic under certain later-to-be-described scene lighting conditions) and two flash illumination modes (a first flash mode wherein the shutter blade displacement program favors an incandescent bulb flash source and a second flash mode wherein the blade displacement program is more suitable for an electronic strobe flash source).

As will be described hereinafter, in one ambient mode and both flash modes, the aperture defining displacement of the blades is controlled by the input of a binary coded number corresponding to a given number of blade displacement steps from the closed position necessary for the blades to define a given exposure aperture. In a preferred embodiment of the invention a Gray code disk is utilized to provide an unambiguous coded binary number input in that the binary code is arranged such that successive digits in the scale are defined by but only one bit change. Advantageously, the Gray code disk is mounted for rotation about a common axis with a lens focus wheel and is adapted to be selectively coupled to and decoupled therefrom to provide an aperture determining digital input signal that is related to scene distance (as defined by lens focus distance) for flash mode operation and a digital input signal that is independent from lens focusing distance for at least one of the two ambient illumination modes of operation.

BRIEF DESCRIPTION OF THE DRAWINGS

For a fuller understanding of the nature and objects of the present invention, reference should be made to the following detailed description taken in connection with the accompanying drawings wherein:

FIG. 5 is a table showing the 5 bit Gray coded binary numbers used to represent the 24 discrete steps through which the shutter/aperture blades are adapted to be driven by the stepper motor;

DESCRIPTION OF THE PREFERRED EMBODIMENT

Figure 1:
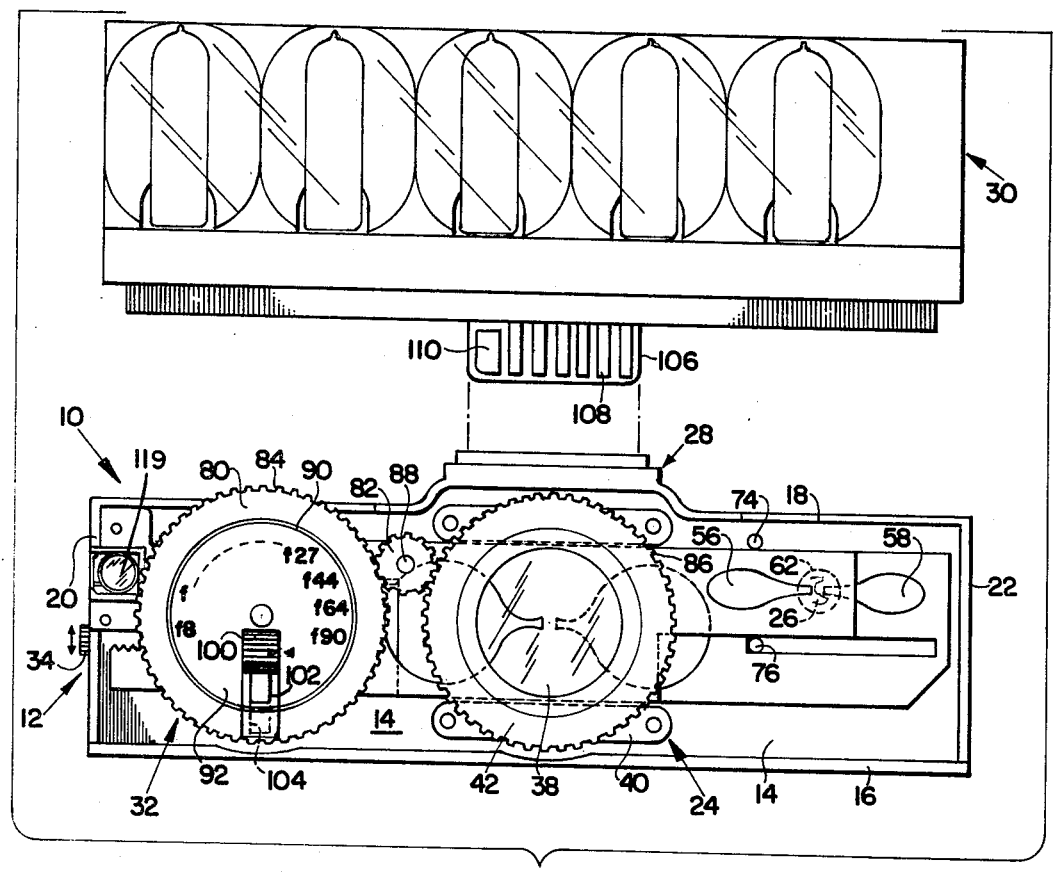
FIG. 1 is a front elevational view of the major components of the exposure control system embodying the present invention.
Figure 2:
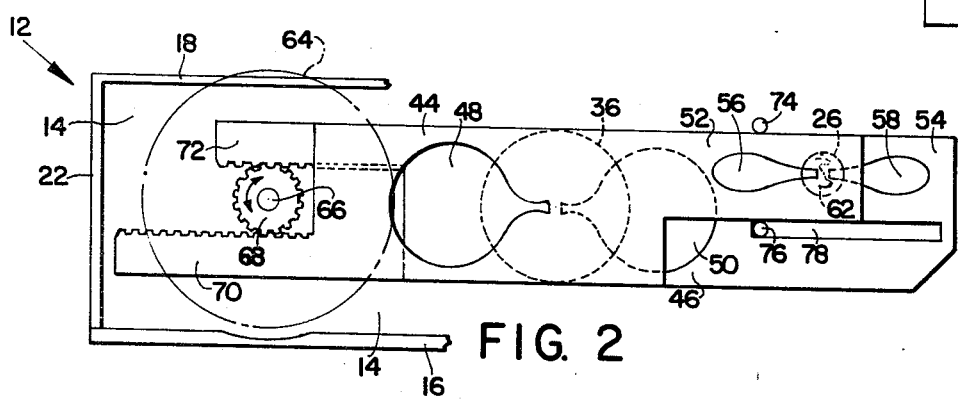
FIG. 2 is a diagrammatic representation of a pair of shutter/aperture blades, a photocell station and a stepper motor for reversibly driving the blades stepwise between fully opened and closed positions.

FIGS. 1 and 2 of the drawings show a multiple mode exposure control system 10, being selectively operable in a plurality of ambient and flash illumination modes of operation, for use in a photographic apparatus, such as a camera, for regulating the transmission of image forming light rays from a scene to be photographed along an optical path to a photographic film unit located at a given focal plane (neither of which is shown) of the apparatus.

A generally rectangular shell-like support member 12, comprising a rear wall 14, bottom and top walls 16 and 18 respectively, and a pair of side walls 20 and 22, serves as the main mounting frame and support for most of the system's components.

These components include, a lens and shutter/aperture blade assembly 24; a photocell element 26; a socket assembly 28 for receiving a source of flash illumination such as the illustrated multilamp flash bar 30; a lens focusing, aperture selector, blade drive, and cycle start button assembly 32 (also see FIG. 7); a mode selector switch 34 mounted on side wall 20; and a mode selecting and control logic system 35 to be described with reference to FIG. 6 and being for the most part on an electronic circuit mounting board (not shown) being substantially coextensive with and attached to the back side of the rear wall 14 of support frame 12.

Support member 12 has a circular exposure opening 36 in rear wall 14, shown in dotted lines in FIG. 2, through which image forming light rays from a scene are adapted to be transmitted to a film unit at the focal plane along the system's optical path or axis which coincides with the center of opening 36. The circuit board (not shown) on the back of wall 14 has an opening therein that is coextensive with opening 36.

The image forming light rays are provided by an adjustable focus objective lens 38 of assembly 24 which also includes a rear lens mount and shutter blade support member 40 fixedly mounted on wall 14 over and in alignment with opening 36 and forward lens mount or bezel 42 supporting one or more movable elements of lens 38 and having internal threads in rotatable engagement with complementary threads on rear mount 40 so that the forward mount 42 may be axially displaced for focusing purposes in response to rotation of front mount 42. Lens 38 is mounted on support member 14 such that optical axis of lens 38 coincides with the system's exposure optical path.

As best shown in FIG. 2, system 10 includes a pair of thin elongated shutter/aperture blades 44 and 46 formed of any suitable light opaque material, such as plastic or aluminum, having tapered apertures or primary openings 48 and 50, respectively, which are shown in non-overlapping relation in their closed or blocking position over the optical path to prevent light rays transmitted by lens 38 from passing through opening 36 to the focal plane. From the closed position, blades 44 and 46 are adapted to be driven stepwise, simultaneously in opposite directions (blade 44 to the right and blade 46 to the left), in a given number of discrete steps (preferably 24 steps) to a fully opened position wherein the primary apertures 48 and 50 are aligned and fully overlap to completely unblock the optical light path through exposure opening 36. As the blades 44 and 46 are progressively displaced stepwise between the closed and fully opened positions, the apertures 48 and 50 cooperate to define a progressively changing exposure aperture or aperture value over the optical path with each successive step. Thus blades 44 and 46 serve as both exposure aperture defining and shutter means. In response to forward or opening blade displacement to initiate an exposure interval, the tapered apertures 48 and 50 cooperate to define a progressively larger exposure aperture with each step until they reach the last opening step wherein the blades are in the fully open unblocking position and they define a maximum exposure aperture or value. Of course, as the blades are displaced in the opposite direction toward the closed position to terminate the exposure interval the exposure aperture becomes progressively smaller with each successive closing step.

Blades 44 and 46 include right end extension portions 52 and 54 having secondary tapered apertures 56 and 58, respectively, therein which do not overlap when blades 44 and 46 are in the closed position so as to block a scene light optical path to a photocell element 26 mounted on the circuit board in optical alignment with a photocell access aperture 62 in rear wall 14 of support member 12. As the blades 44 and 46 are progressively displaced toward the fully opened position, secondary apertures 56 and 58 cooperate to define a progressively larger aperture over the photocell optical path, which correspond proportionally to the exposure aperture defined by apertures 48 and 50 for a given blade displacement step, until the last opening step wherein apertures 56 and 58 define a maximum aperture at which the photocell optical path is completely unblocked.

Functionally apertures 56 and 58 serve to regulate the transmission of light reflected from the scene to be photographed to photocell element 26 which monitors scene lighting conditions and is part of a scene light integrating circuit, to be described later with reference to FIG. 6, that forms a portion of the control subsystem of system 10. Of course, apertures 56 and 58 form progressively smaller exposure apertures over the photocell optical path as blades 44 and 46 are progressively displaced stepwise towards the closed position. Light from the scene, or a selected portion thereof, may be directed along the photocell optical path by a field lens (not shown) positioned in front of blade extensions 52 and 54 in alignment with photocell element 26.

For an example of a suitable field lens and also an exposure trim system that may be appropriately modified for use with exposure system 10, reference may be had to copending application Ser. No. 930,029 filed on Aug. 1, 1978 and being assigned to the same assignee as the present invention.

The blades 44 and 46 are adapted to be driven stepwise between their closed and fully opened positions by by an intermittently operating driver, preferably a reversible electrical stepper motor 64 located and supported in a plastic molded housing 66 forming part of assembly 32. (see FIG. 7).

Stepper motor 64 includes an output shaft 66 having a blade drive gear or pinion 68 fixedly secured thereto. In order to operatively couple blades 44 and 46 in driving relation with pinion 68, the blades 44 and 46 include left end elongated extensions 70 and 72, respectively, being integrally formed elongated racks or gear teeth which are in operative mesh with pinion 68 at diametrically opposite portions thereof.

As best shown in FIGS. 1 and 2, in addition to the guiding support provided by rear lens mount 40, additional guiding support for blades 44 and 46 are provided a first or upper guide pin 74 which is mounted on support member rear wall 14 and extends forwardly over the top edges of blade extensions 52 and 54 and a second guide pin 76 on wall 14 that extends through an elongated horizontal guide slot 78 integrally formed in blade 46.

In response to counterclockwise stepped rotation of pinion 68 by motor 64, blades 44 and 46 are driven stepwise simultaneously in opposite directions (blade 44 to the right, blade 46 to the left) along a linear blade path of travel from the closed position toward the fully opened position (not shown). In response to reverse stepped rotation of motor 64, the clockwise rotating pinion 68 drives the blades 44 and 46 in the opposite directions towards the closed position.

In a preferred embodiment, stepper motor 64 is of the permanent magnet rotor type which may be configured for fully step (15°) or half step (7.5°) operation. In the full step configuration motor 64 rotates through a full revolution (360°) in 24 equally spaced and magnetically detented steps. In the half step configuration it provides 24 equally spaced steps in only one half (180°) of a full revolution. By appropriately choosing the proper size for pinion 68 and the corresponding tooth structure of racks 70 and 72 for either full step or half step operation, motor 64 and blades 44 and 46 may be configured so that the blades 44 and 46 are driven between the closed and fully opened position in 24 equally spaced steps. That is, there are 24 opening steps and 24 closing steps. Although the illustrated embodiment is designed for 24 step operation, a different total number of shutter/aperture blade steps may be employed without departing from the scope of the present invention.

For an example of an electrical stepper motor suitable for use in the present exposure control system 10, reference may be had to commonly assigned U.S. Pat. No. 3,882,522 issued to Irving Erlichman on May 6, 1975.

Figure 7:
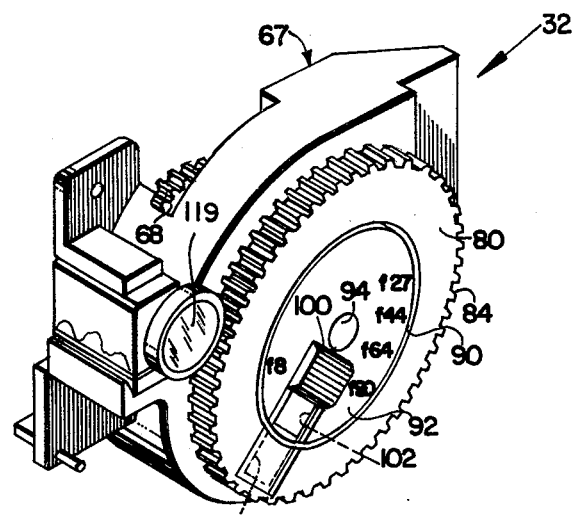
FIG. 7 is a perspective view of the lens focus wheel, aperture selecting wheel and stepper motor housing assembly.

As best shown in FIGS. 1 and 7 the lens 38 is adapted to be displaced axially for focusing by rotating a lens focusing wheel 80 which is coupled to forward lens mount 42 by an intermediate idler gear 82. As best shown in FIG. 1, focus wheel 80 and cylindrical lens mount 42 have appropriate integrally formed gear teeth 84 and 86 respectively which are in operative mesh with the teeth of idler gear 82. Gear 82 is rotatably mounted on housing 66 at pin 88.

The lens focusing wheel 80 includes a central recess 90 for rotatably receiving an aperture selecting wheel 92 fixedly secured to one end of a rotatable axial shaft 94 having its opposite end rotatably mounted in a suitable bearing (not shown) in motor housing 67 (see FIG. 7). It will be noted that wheel 80 includes a flanged bearing 96 through which shaft 94 extends thereby mounting wheel 80 on shaft 94 so that it is selectively rotatable about shaft 94 independently of the position and/or rotation of shaft 94 and aperture selecting wheel 92. Fixedly mounted on shaft 94 behind focus wheel 80 is a Gray code disk 98 (to be described in detail later with reference to FIG. 4) located thereon in fixed predetermined angular relation to aperture selecting wheel 92 so as to be rotatable therewith in a predetermined manner. As best shown in FIGS. 1 and 7 aperture selecting wheel 92 has a sliding latch member 100 including a locking tab 102 thereon that is adapted to extend into a receiving slot 104 in the periphery of wheel 80 when slide latch 100 is in its down or locking position (not shown) thereby coupling wheels 80 and 92 together for simultaneous rotation and to be retracted and disengaged from slot 104 when slide latch 100 is raised or unlocked (as shown in FIGS. 1 and 7) to uncouple wheels 80 and 92 and permit their independent rotation.

As best shown in FIGS. 1 and 7 aperture selecting wheel 92 includes aperture setting numbers (only a few being shown in the drawing) about its periphery, each of which is adapted to be aligned with a fixed indicator mark (not shown) in response to rotation of wheel 92 to select one of the 24 possible exposure aperture values corresponding to the 24 blade steps. The indicator mark is preferably located adjacent wheel 80 on a front housing section (not shown) which covers the front of support member 12 but provides appropriate access openings for wheels 80 and 92, lens 38 and the photocell field lens.

When wheels 80 and 92 are coupled together, the aperture wheel 92 and Gray code disk 98 turn with the lens focus wheel 80 and are thereby angularly positioned at a particular location that is proportional to lens focus distance which the Gray code disk will translate into a binary coded input number indicating the number of steps that the blades will be displaced toward the fully open position. This, in effect, is a follow focus system for flash mode operation wherein the simultaneous rotation of wheels 80 and 92 and disk 98 causes the lens 38 to be displaced axially and focused at a particular scene distance and provides a Gray coded binary number to the control unit indicating the number of blade opening steps (thereby defining an aperture or range of apertures corresponding to the given number of steps) so that blades 44 and 46 operate to automatically define a range of aperture values that is appropriate for correct exposure of a scene at the selected focus distance with a source of flash illumination of known intensity.

By uncoupling wheels 80 and 92, wheel 92 and disk 98 may be rotated independently of lens focusing wheel 80 thereby allowing the operator to "dial in" or select a personally preferred range of aperture values under certain lighting conditions independent of lens focus distance when system 10 is set for semiautomatic ambient illumination operation as will be described later.

Turning for a moment to the flash system, the flash socket 28 on top wall 18 of support member 12 is adapted to operatively receive the multilamp incandescent bulb flash unit 30 as indication. Depending from flash unit 30 is a thin insulative blade 106 having a plurality of lamp contacts 108 which engage a plurality of corresponding flash fire contacts (not shown) in socket 28 when blade 106 is operatively positioned therein. Blade 106 also includes a double width contact or shorting bar 110 which bridges and electrically connects a pair of flash mode selector switch contacts (not shown) in socket 28 when blade 106 is inserted therein. As will be described later with reference to FIG. 6, the flash mode selector switch (designated at 112) is normally open or nonconductive when there is no flash unit 30 operatively coupled to socket 28 and becomes closed or conductive when unit 30 is inserted and shorting bar 110 connects the open contacts of flash mode switch 112. Thus electrical condition (open or closed) of switch 112 indicates the absence or presence of an operatively connected flash unit 30 in socket 28.

In a preferred embodiment the exposure control system is configured for use with either a source of flash illumination utilizing incandescent flash lamps (such as the illustrated flash bar 30) or a high intensity short duration electronic strobe light (not shown). It will be noted that such a strobe unit will include an appropriate blade 106 thereon including contacts 108 and a shorting bar 110 or it will be connected to socket 28 by means of a suitable adapter having contacts 108 and a shorting bar 110. That is, no matter if the flash source is an incandescent lamp or strobe unit, the normally open flash mode selector switch 112 will be automatically closed when one of these two types of flash sources is coupled to socket 28.

Figure 3:
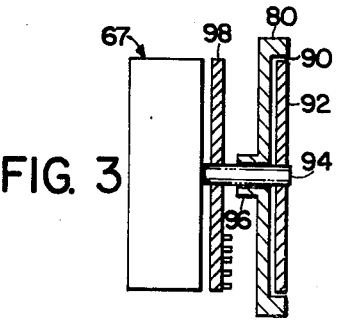
FIG. 3 is a side elevational view, partly in section, of a lens focus wheel and a coaxially mounted Gray code disk assembly for providing a Gray coded binary number input to a stepper motor control system.

As noted earlier, the Gray code disk 98, shown in FIGS. 3 and 4, in combination with a code sensor or "reader" 114 provides a Gray coded binary number (see table in FIG. 5) for each of the 24 steps corresponding to 24 equally angularly displaced positions of disk 98 relative to the fixed indicator mark.

Figure 4:
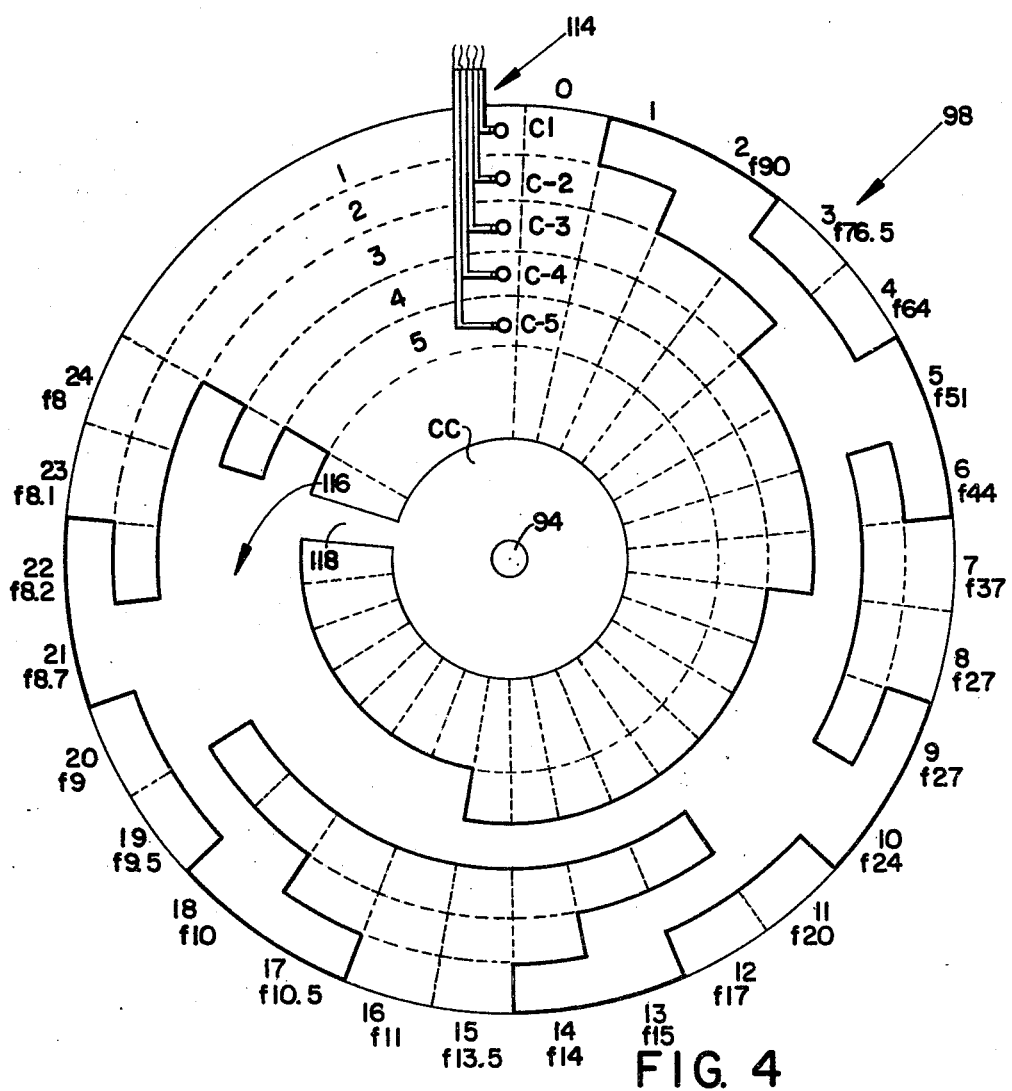
FIG. 4 is an enlarged plan view of a Gray code scale switching arrangement located on the back side of the disk shown in FIG. 3.

As best shown in FIG. 4, Step 1 corresponded to the closed light blocking position of blades 44 and 46 wherein apertures 48 and 50 do not overlap and therefore do not define a light transmitting exposure aperture. At Step 2 blades 44 and 46 are displaced one step from the closed position and apertures 48 and 50 define the smallest exposure aperture, preferably f90. With each successive blade opening step, the apertures 48 and 50 define the indicated progressively larger exposure apertures until the maximum exposure aperture f8 is reached at the Step 24 fully opened position of blades 44 and 46.

From the table in FIG. 5 it will be noted that the 24 step numbers 1–24 are represented by 5 bit Gray coded binary numbers which differ from the standard binary numbers which are not particularly well suited for electrical or electrical-optical encoder systems (angular position shaft encoders such as Gray code disk 98) because movement from one state (step) to the next often results in more than one bit change. For example, from number 7 to number 8 the standard binary number changes from 0111 to 1000. Such bit changes generally can not be really simultaneous, so the encoder tends to generate erroneous or ambiguous transient codes when switching between certain positions (steps). This problem is avoided with a Gray code because only one bit changes between adjacent states (steps). Although the Gray coded numbers must be converted to the equivalent standard binary number before any arithmetic can be performed, it is preferable to use the Gray code in the interest of accurate and reliable aperture setting.

In the illustrated embodiment the Gray code disk 98 is formed of any suitable electrically insulated material and has an electrically conductive contiguous Gray code pattern area 116 (within the heavy bordering lines in FIG. 4) formed thereon, by any suitable printed circuit technique, of an electrically conductive material such as copper. The Gray code pattern is registered on 5 concentric circular tracks (designated 1 through 5) in proper alignment with each of the indicated steps 1 through 24. It will be noted that the contiguous patterned conductive area 116 terminates in a central circular common contact (designated CC) by means of an integral conductive bridge 118 connecting conductive track 5 at Step 23 with contact CC.

The illustrated sensor 114 is a 5 wire device comprising electrical contacts designated C-1 to C-5 which are electrically insulated from each other and are combined in a unitary fixedly mounted structure with the contacts C-1 through C-5 positioned in surface engaging alignment with tracks 1 through 5, respectively, on disk 98. The contacts C-1 through C-5 each serve as one contact of 5 sensing switches. The other contact is provided by the conductive Gray code pattern area 116 and is common to all five sensing switches through a single wire (not shown) electrically connected to common contact CC.

For the sensor 114 and disk 98 to provide the Gray code binary number output the conductive or closed state of the 5 sensing switches represents 1 and the non-conductive or open state represents 0. In FIG. 4, track 1 is indicative of the binary digit at the right hand end of the binary number, track two represents the next left adjacent number, etc.

As will be apparent from FIG. 4, if the disk 98 is rotated in a counterclockwise direction from the illustrated position so that the contacts of sensor 114 all lie within the Step 1 radial sector bounded by the dotted radial lines, contact C-1 will engage the conductive area 116 on track 1 thereby closing the first sensor switch and providing a 1 output. Contacts C-2 through C-5 engage the insulative portion of disk 98 on tracks 2 through 5 of the Step 1 sector and remain open or non-conductive and each provides an 0 output. Thus the collective electrical outputs of the five sensor switches define the Step 1 Gray coded number 00001 shown in FIG. 5. As the disk 98 is advanced to successive steps, the 5 bit Gray coded number changes correspondingly by one bit. For example, at Step 2 sensor switches 1 and 2 are closed, switches 3, 4 and 5 remain open and the Gray coded step number is 00011.

While the illustrated Gray code disk 98 and sensor 114 comprise an electrical switching arrangement to provide the coded binary number it is within the scope of the invention to use other Gray coding systems known in the art, such as an electro-optical system wherein disk 98 has a black and white Gray code pattern thereon and sensor 114 includes an electro-optical reader or a magnetic disk and 5 track playback head.

Figure 6:
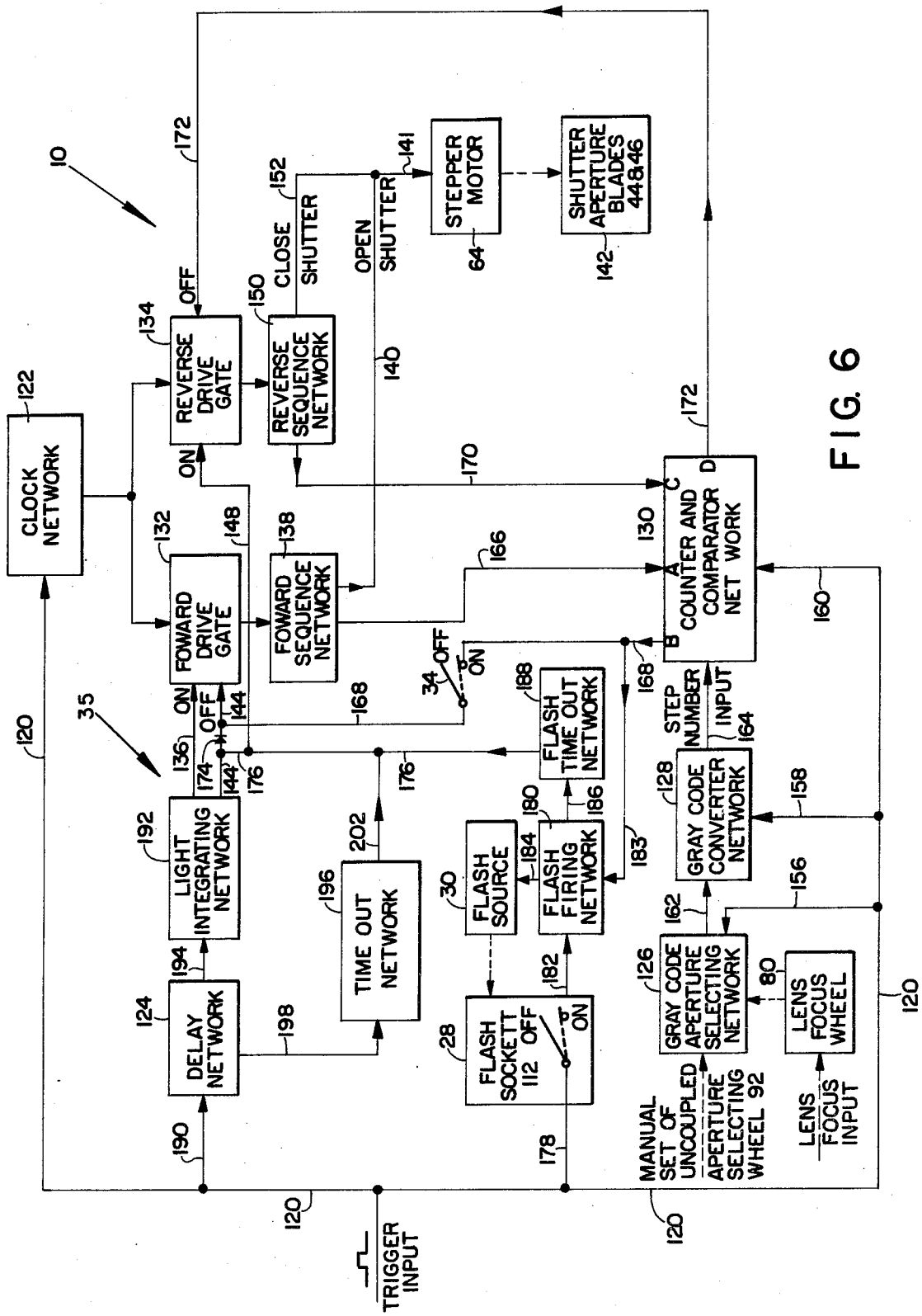
FIG. 6 is a functional block diagram of the exposure control system embodying the present invention.

Turning now to FIG. 6, the connection and intersection of the various components of system 10 and its multiple ambient and flash illumination modes of operation will be explained.

System 10 was described earlier as including an electrical camera cycle start button switch, designated 119, which is manually actuable to initiate a cycle of camera operation. Because the present invention is directed to the exposure phase of the cycle, camera events that precede or follow film exposure will not be described. Preexposure events may include movement of a reflex member to change the camera from a reflex mode to the exposure mode. Post-exposure events may include film transport and processing in a self-developing camera. In FIG. 6, the initiation of the exposure phase is indicated with the provision of a trigger input pulse on input line 120. This pulse may be provided directly in response to actuation of button switch 119 or it may be provided automatically following certain pre-exposure events initiated by actuation of switch 119. For an example of a single lens reflex self-developing camera in which the instant exposure control system 10 may be used, see commonly assigned U.S. Pat. No. 3,820,128.

It will be noted, that just prior to the initiation of the exposure cycle, the shutter aperture blades 44 and 46 are located at the Step 1 closed light blocking positions.

The trigger input pulse on line 120 is shown passing to a plurality of networks and components including clock network 122; delay network 124; flash mode selector switch 112 in socket 28; Gray code aperture selecting network 126; Gray code converter network 128; and counter and comparator network 130 for connecting these elements to a source of electrical energy (not shown) such as a battery supplied in the camera or film pack used therewith.

The input pulse triggers clock network 122 which produces equally spaced timing pulses that are fed to a forward drive gate 132 and a reverse drive gate 134. When forward drive gate 132 is turned on by an "ON" input signal on line 136, it becomes conductive so that the clock pulse pass to forward sequencing network 138 which energizes stepper motor 64 with opening energizing signals over lines 140 and 141 in a forward or opening drive signal sequence designed or progressively displace blades 44 and 46 (designated block 142 in FIG. 6) from the Step 1 closed position toward the Step 24 fully opened position. The forward drive signals are provided by network 138 until gate 132 is shut off by an appropriate "off" signal input provided over line 144. The blades 142 are displaced in the opposite direction when reverse drive gate 134 is turned on by an "on" input signal provided over line 148 causing the clock pulses to pass to reverse sequencing network 150 which energizes motor 64 with closing energizing signals over lines 152 and 141 with a reverse or closing drive signal sequence designed to displace blades 142 from an open aperture defining position to the Step 1 closed position. These reverse drive signals are provided until reverse drive gate 134 is shut off with an "off" input signal provided over line 172.

For the sake of clarity, the sequencing networks 138 and 150 are shown as separate circuits comprising a series of flip flops or the like conventionally interconnected to deliver clock pulses to motor 64 to drive it in the forward or reverse direction. Preferably the sequencing networks 138 and 150 could be combined in a single integrated circuit along with forward and reverse drive gates 132 and 134.

The input trigger pulse on line 120 also energizes and actuates the Gray code network 126 (comprising disk 98 and sensor 114) over line 156; Gray code converter 128 over line 158 and counter and comparator 130 over line 160.

The Gray code network 126 is set in one of two ways by rotating disk 98 to an appropriate position to provide the Gray coded number signal indicative of a particular blade step number. When aperture selecting wheel 92 is uncoupled from focus wheel 80, the operator may manually rotate wheel 92 to the selected aperture position thereby setting disk 98 which rotates with wheel 92 so that the appropriate step number radial sector is aligned with the 5 contact sensor 114. When wheel 92 is coupled to focus wheel 80 for rotation therewith, the disk 98 is operated in the follow focus arrangement for flash mode operation noted earlier so that the disk 98 is automatically set to an appropriate step number sector in accordance with the distance at which lens 38 is focused. Thus disk 98 is set either by (1) manual input of the operator (wheels 80 and 92 uncoupled) or (2) by focusing lens 38 with focus wheel 80 (wheels 80 and 92 coupled).

The Gray coded step number output of network 126 is fed into converter 128, over line 162, which converts the 5 bit Gray coded binary number into its equivalent 5 bit standard binary coded step number which is transmitted to counter and comparator network 130 over line 164 where it is stored in a step number input register.

Network 130 is a multiple register signal counting, storing and comparing control circuit which serves as a signal processor and traffic director.

One function that it serves is to count the number of steps that the blades 142 are displaced from the Step 1 closed position towards the fully opened Step 24 position and compare it to the stored binary coded step number provided from Gray code network 126 through converter 128. The input for counting opening blade steps is provided by counting the pulses provided by forward sequencing network 138 to motor 64. Such pulse signals are provided from an auxiliary signal output of sequencing network 138 to counter input A of network 130 over line 166. When the number of forward drive pulses (equal to blade opening steps) provided over line 166 in the counter equals the step number input from line 164 stored in the register, a comparator subcircuit of network 130 provides a control pulse output at output B connected to line 168.

Another function of network 130 is to remember the number of opening blade steps, count the number of closing blade steps and provide a motor drive turn off signal to terminate further close blade displacement when the blades 142 have been returned to the closed Step 1 position.

The number of blade opening steps is stored in counter A. As the blades 142 are closed, an auxiliary output of reverse sequencing network 150 sends it timed pulse signals over line 170 to the input of a second counter C of network 130. A second comparator subcircuit of network 130 monitors counters A and C. When the number of closing pulses equals the number of opening pulses stored in counter A, the comparator subcircuit provides a control output pulse at output D to line 172 which is fed to the "off" input of reverse drive gate 134 thereby shutting off motor 64 by terminating the input of clock pulses thereto from network 122 through networks 134 and 150.

The mode selector means of system 10 includes the manually operable mode selector switch 34 on support member side wall 20 and the flash source sensing switch 112 formed in part by a pair of contacts in socket 28 and the shorting bar 110 on the blade 106 of flash source 30.

The mode selector switch is series connected in line 168 leading from output B of network 130 to the "off" signal input line 144 of forward drive gate 132 when switch 34 is in its closed conducting position. As shown, a diode 174 is located in line 144 ahead of the connection of line 168 to prevent this signal from also being fed to reverse drive gate 134 via line 176, coupled to line 144 ahead of diode 174, and line 148 leading from line 176 to the "on" input of gate 134.

When switch 34 is open or nonconductive, line 168 is interrupted and the output B signal applied to line 168 is not fed to line 144. The effect of mode selector switch 34 will be discussed in detail hereinafter in conjunction with a description of the four operating modes of system 10.

The second mode selector switch 112 is series connected in input line 178 to flash socket 28. If there is no flash unit operatively coupled to socket 28, switch 112 remains open so that a flash firing network 180 connected to switch 112 by output line 182 is not enabled or energized in response to an input trigger pulse on line 120. When a flash source 30 is plugged into socket 28, switch 112 is automatically closed and such enablement takes place. Once flash firing network 180 is enabled, it is actuable, upon receiving the control pulse from output B of counter and comparator network 130 over input line 183 connected to line 168, and provides a flash firing signal over output line 184 to flash source 30. Network 180 also includes an auxiliary output which provides an actuating signal over line 186 to a flash time out network 188. Network 188 is a simple delay circuit which provides a delayed signal over output line 176 to the forward drive gate "off" input via line 144 and the reverse gate "on" input via line 148. As will be explained later the flash time out network is utilized to provide an exposure cycle terminating signal in the strobe flash mode.

In response to the trigger input signal on line 120 the delay circuit 124 is enabled over line 190. After a very short delay to permit the number of opening blade steps selected by the Gray code network to be stored in the register of network 130, delay network 124 enables and actuates light integrating network 192 over line 194 and time out network 196 over line 198.

Light integrating network includes photocell element 2, 6, monitors scene lighting conditions, integrates light reflected therefrom and provides a trigger signal output when a predetermined voltage indicative of a predetermined total amount scene light integrated over time. Upon initial energization and actuation of network 192 it also provides an output pulse over line 136 to the "on" input of forward drive gate 132 and turns it on. Upon reaching its trigger voltage in response to integrating scene light it provides the trigger output pulse over line 144 to turn off forward drive gate 132 and also to the "on" input of reverse drive gate 134 over line 148 via the connection of line 144, ahead of diode 174, to line 148 by a portion of line 176.

The time out network 196 is a simple delay circuit which provides an output signal over to line 202 to line 176, at a time that is longer than the longest anticipated ambient light exposure interval consistent with hand held camera operation or time exposures when the camera is tripod mounted, to turn off forward drive 132 via the connection of line 176 with line 144 and to turn on reverse drive gate via the connection of line 176 with line 148.

The two ambient and two flash modes of operation will be described now.

In both ambient modes of operation the flash socket 28 does not have a flash source 30 operatively coupled thereto, and the first mode selecting switch (flash selector switch 112) forming part of the mode selecting means remains in its open or nonconductive state.

The first ambient illumination mode to be explained is the fully automatic mode in which the mode selector switch 34 in line 168 is in its "off" or open nonconductive state so that the control pulse generated at output B of counter and comparator network 130 when the number of steps that the blades 142 have been displaced from the Step 1 closed position equals the step number (maximum aperture) set by the Gray code disk 98 is not transmitted to line 144.

In the fully automatic mode, control over the exposure is provided for the most part by the light integrating network 192.

Before the exposure cycle trigger pulse is provided over line 120 the blades 142 are located in the fully closed Step 1 position and the networks shown in FIG. 6 are deenergized.

In response to the trigger input, the Gray coded binary number provided by disk 98 and sensor 114 is fed through converter 128 and is stored in the register of counter and comparator network 130. Following the short delay provided by delay network 124, the light integrating network 192 and time out circuit 196 are enabled and actuated. Light integrating circuit 192 provides a trigger signal on line 136 turning on forward drive gate 132. Clock pulse signals from network 122 (enabled and actuated in response to the trigger input on line 120) pass through gate 132 and the forward sequencing network 138 to energize stepper motor 64 in a forward sequence whereby pinion 68 is driven stepwise in a counterclockwise direction causes blades 142 (blades 44 and 46) to be displaced stepwise toward the fully open position (Step 24) in equally timed steps. It will be noted that the reverse drive gate 134 is in the off state having been set in this condition at the end of the preceding exposure cycle.

As the blades 142 step open, the exposure aperture (defined by primary apertures 48 and 50) over the optical path to the focal plane becomes progressively larger with each successive step toward the fully open position. As the primary apertures 48 and 50 define the increasing exposure aperture the secondary apertures 56 and 58 define the correspondingly progressively increasing aperture over the optical path to the photocell element 26, which respond to scene light. When the photocell subcircuit of light integrating network 192 reaches a predetermined voltage indicative of a predetermined amount of scene light reaching the film unit, network 192 provides a trigger signal over line 144 to (1) the "off" input of forward drive gate 132 turning it off and terminating the flow of forward sequenced clock pulses to motor 64 and (2) the "on" input of reverse gate 134 turning it on to begin the flow of reverse sequenced clock pulses to motor 64 through reverse sequencing network 150. It will be remembered that during the blade opening sequence that forward sequencing network provided step signals indications to counter A of network 130 over line 166 so that the total number of opening steps has been stored in counter A. In response to the reverse sequenced clock pulses, the motor pinion 68 is driven in the clockwise direction and the blades 142 are displaced toward the fully closed position. As the blades 142 are closed, reverse sequencing network 150 provides clock pulse indication signals over line 170 to Counter C. The second comparator subcircuit monitors the count of counter C and continuously compares it to the total number of opening steps indicated by the stored binary number in counter A. When these two numbers are equal, blades 142 are back at the fully closed Step 1 position and network 130 provides the control pulse over line 172 to turn off reverse drive gate 150 and terminate the exposure cycle.

It will be noted that in the fully automatic mode, while the Gray code network 126, converter 128, the receiving register, counter A and the comparator that compares the numbers in the register and counter A and provides the control signal at output B of network 130 are operative, the control signal is not used at all in determining exposure. That is, because mode selector switch 34 is off this control signal is not transmitted to the "off" input of forward drive gate 132 over line 168. The only way gate 132 can be turned off is by means of the light integrating network output over line 144. Also, even though the control signal provided from output B is fed to the flash fire network 180 over line 184, it is ineffective to actuate network 180 because there is no flash source 30 in socket 28 and flash selector switch 112 is open leaving flash firing network in its unenergized or disenabled state. Therefore it makes no difference where the Gray code disk 98 and aperture selecting wheel 92 are set relative to the indicator mark or whether wheel 92 is coupled to or uncoupled from the lens focusing wheel 80 because the aperture selecting input over line 164 and the resultant control signal output (if the aperture number set is equal to or lower than the number of actual blade opening steps) do not affect exposure.

However, by simply switching the mode selector switch 34 from its off state to its on or closed conductive state the exposure control system 10 embodying the present invention is switched from the automatic mode to a semi-automatic ambient illumination mode whereby the control means of the system are reprogrammed to include the influence of the aperture selecting wheel 92 and its coupled Gray code disk 98 in determining the exposure parameters.

The semiautomatic mode allows the operator to at least have a limited choice of the range of aperture values that are in effect during exposure. During this mode, the aperture selecting wheel 92 is uncoupled from lens focusing wheel 80 so that the operator may move wheel 92 independently of wheel 80.

For example, assume that a photograph taken during automatic operation appears to have less depth of focus than desired indicating that the average exposure aperture defined during exposure was too great. For convenience the average exposure aperture during exposure (recognizing that exposure aperture is small at the early low numbered steps, becomes larger with each successive opening step, peaks at the last opening step then becomes progressively smaller again as the blades close) will be discussed in terms of maximum aperture at the last opening step before blade reversal. For example, an exposure wherein the blades open to a maximum exposure aperture of f20 at Step 11 will be made at a smaller average aperture than an exposure wherein the blades open to a maximum exposure aperture f8.2 at Step 22 before closing.

Also, assume that during the automatic exposure having less than a personally desired amount of depth of focus, the control system operating in automatic mode under the influence of light integrating network 192 set a maximum exposure aperture of f9.5 at Step 19. To increase depth of focus, under the same scene lighting conditions the operator may "dial in" a maximum aperture setting of f15 at Step 13 thereby providing a lower or smaller average aperture to increase depth of focus.

With mode selector switch 34 closed, the output B control signal may be fed to the "off" input of forward drive gate 132 over lines 168 and 144. Because the light sensing network 192 remains operational during semi-automatic operation and also may provide an output to turn off gate 132 over line 144 a race condition is set up between light integrating network 192 or the Gray code aperture selecting system.

Prior to exposure, the operator turns aperture selecting wheel 92 and sets the f15 Step 13 aperture mark in alignment with the fixed indicator mark and then initiates a cycle of operation which provides the trigger input pulse on line 120. The Gray coded binary number designating Step 13 is passed through converter 128 which changes it to the equivalent standard binary number which is transmitted over line 164 is stored in the register of network 130. Following the delay provided by network 124 the light integrating network 192 and time out network 196 are energized and actuated. Network 192 provides the signal over line 136 to turn on forward drive gate 132 and the blade opening sequence begins with forward sequencing network providing pulse indications to counter A over line 166. As the blade opening sequence begins network 192 begins its light integration sequence.

Because the scene lighting conditions are the same as the exposure made in the automatic mode, it is known that the blades 142 would keep opening until the f9.5 Step 19 exposure aperture wherein light integrating network 192 would trigger and reverse the blade displacement process. However, the operator has "dialed in" a maximum aperture of f15 at Step 13. When the blades 142 reach Step 13 the number in counter A will equal the number "dialed" into the register and the comparator circuit will provide the control pulse, at output B, which travels over lines 168 and 144 and turns off forward drive gate 132 thereby stopping the blades 142 at the f15 Step 13. As noted before, the secondary apertures 56 and 58 in blades 44 and 46 provide progressively larger apertures over the photocell path but in this instance the aperture becomes fixed at the corresponding maximum photocell aperture related to Step 13. Because there is reduced light flux transmitted to the photocell element 26 it will take the photocell circuit longer to trigger thereby extending the time interval of the exposure to compensate for the small average exposure and photocell apertures. When the trigger voltage is reached, light integrating network 192 provides its trigger output to line 144. This signal is fed over line 144 to the "off" input of forward drive gate 132 but has no affect because the gate 132 has already been turned off by the earlier control pulse from output B. But, the trigger signal is also fed from line 144 to line 148 via line 178 and it turns on the reverse drive gate 134 to initiate the termination of exposure as described previously.

In this instance where the "dialed in" maximum aperture was smaller than the maximum aperture that would have been set by the light integrating network 192 the Gray coded aperture selecting system wins the race with the light integrating network 192 thereby allowing the operator to override the automatic system with this semi-automatic mode input.

However, the operator may only override the automatic mode in a limited sense and select a maximum aperture that is smaller than the maximum aperture that will be set automatically by network 192. That is, if the operator dials in a larger maximum aperture in an attempt to reduce depth of focus, the light integrating network 192 will trigger and initiate exposure termination before the number in counter A reaches in the operator selected maximum aperture. Under these conditions the light integrating circuit wins the race as it should. To do otherwise would cause overexposure of the film unit.

Exposure control system 10 is programmed for flash operation when a flash source is operatively coupled to socket 28 thereby closing the flash mode selector switch 112 which operatively couples the flash fire network 180 and flash time out network 188 to the control system. System 10 is set for a first flash mode particularly well suited for use with an incandescent lamp source 30 by also moving the mode selector switch 34 to its open position. The second flash mode for use with an electronic strobe flash source 30 is set by locating switch 34 in its closed position.

It is well known in the art of flash photography that the light output of an incandescent lamp varies over its burn time. From initial ignition, the light output builds up progressively to a peak output and then diminishes as combustion abates. The total light output is defined as the integrated area bounded by an intensity vs. burn time curve. Compared to a high intensity short duration strobe light which rises to and decays from its peak output over a very short time period (i.e., the rise and decay slopes are very steep), the incandescent lamp provides a light output over a relatively long burn time.

In the first flash mode with an incandescent lamp source 30 in socket 28 to close switch 112 and mode selector switch 34 in its open position, the aperture selecting wheel 92 is coupled to lens focus wheel so that the Gray code disk 98 selects an exposure aperture that corresponds to subject or lens focus distance. More commonly, this arrangement is termed follow focus aperture setting. As will be apparent from the following description, system 10 operates in a hybrid mode wherein the light integrating circuit 192 monitors scene lighting conditions which comprise both ambient illumination and flash illumination from incandescent lamp source 30. The Gray code aperture selecting system in the first flash mode keys the firing of the lamp to a focus distance related aperture or opening step number at which, based on the known burn time of the lamp, the light output will peak during a focus distance related range of exposure aperture values. That is, for a relatively close scene or subject, the lamp is triggered to fire relatively early in the blade opening sequence so that the output peaks at a relatively small average exposure aperture to limit the amount of flash light reaching the film unit to control exposure. For a scene that is relatively far away, flash ignition is held off until a later portion of the blade opening sequence so that maximum light output coincides with a larger average aperture. For example, if the subject range is relatively long (12-15 ft.), the system will not fire the lamp until just before the blades 142 reach the fully opened f8 Step 24 position so that the peak light output coincides with the maximum aperture.

In operation the operator focuses lens 38 with wheel 80 thereby automatically rotating wheel 92 and disk 98 to a range related aperture and step number. Upon camera actuation and the receipt of the trigger input on line 120, the "dialed in" aperture number is stored in the register of counter and comparator network 130. After the delay provided by network 124, light integrating network 192 and time out network 196 are energized and actuated and the shutter blade opening displacement cycle is initiated by the forward gate turn on signal delivered by network 192 over line 136. As the shutter aperture blades 142 are displaced from the Step 1 closed position toward the fully open position, step indicating pulses provided over line 166 are counted by counter A. When the step number in counter A equals the step number in the register the comparator circuit provides the control pulse output signal at output B over line 168. From line 168 the control pulse is fed over line 183 to actuate the previously enabled flash firing network 180 which in turn provides a flash firing signal over line 184 to fire lamp source 30 and initiates operation of the flash time out network 188 by means of an output signal provided over line 186. Because mode selector switch 34 is open, the control pulse provided at output B does not reach the line 144 "off" input of forward drive gate 132 so that as the flash source 30 ignites and starts its light output rise toward the peak, the shutter aperture blades 142 continued to be driven stepwise in equally timed opening steps toward the fully open position.

At the beginning of the exposure cycle, the light integrating network 192 began monitoring and integrating scene light. Prior to ignition of lamp source 30 the scene light input to photocell element was solely ambient illumination. As light from lamp source 30 contributed to total scene light, the photocell begins integrating the combination of ambient and flash illumination. At the predetermined total scene light level, the photocell circuit reaches its predetermined voltage and network 192 provides the trigger signal over line 144. As noted early this turns off forward drive gate 132 and simultaneously turns on reverse drive gate 134 by means of the line 144 trigger signal that is transmitted to line 148 via line 176.

It will be noted that the delay built into the flash time out network 188 is sufficiently long so that its output signal provided over line 176 to gate control lines 144 and 148 is set to occur after the gate control signal provided by light integrating network over line 144. That is, in this first flash illumination mode, the gate control signal provided by time out network 188 is ineffective to turn off gate 132 and turn on gate 134 because this function has already been accomplished by the earlier occurring trigger signal provided from light integrating network 192.

The second or strobe light flash illumination mode is set by operatively coupling an electronic strobe light flash source 30 to socket 28 to close flash selector switch 112 and manually locating mode selector switch 34 in its closed conductive position.

In this flash mode, scene lighting is provided almost entirely by the light output of the strobe in the actual film exposure take place during the short duration strobe light flash. Because the light output of the strobe unit is a known quantity, the correct exposure can be made simply by selecting an appropriate exposure aperture value for the particular scene distance that will give the proper exposure value for the film. As in the first flash mode, the aperture selecting wheel 92 is located in coupled relation to lens focusing wheel 80 so that the proper range related exposure aperture or blade opening step number is set automatically in response to focusing lens 38 with wheel 80. In this second flash mode system 10 is programmed by the mode selector means (the arrangement of switches 112 and 34 both set in their closed conducting states) to operate in a classical follow focus sequence wherein the blades are stepped open to the appropriate range related step where the blades are stopped to define the corresponding range related fixed aperture, the strobe unit is fired to expose the film and the blades are then displaced to the closed position. In essence, the exposure is made during the strobe flash and the low amount of ambient light passing through the exposure aperture as the blades 142 are open to the selected range related aperture and then back to the closed position following actuation of the strobe unit contribute minimumly to the exposure.

In operation the lens 38 is focused with wheel 80 automatically setting the Gray code disk 98 in relation to sensor 114 to read out the range related aperture step number. Upon receipt of the trigger input pulse, the Gray coded step number passes through converter 128 and is stored in the register of network 130. Following the short delay provided by network 124 the light integrating network 192 and time out network 192 are energized and actuated.

This triggers the blade opening sequence as described previously. When the step number in the counter A equals the step number in the register indicating the blades 142 are at the proper step to define the corresponding selected range related aperture, the comparator circuit provides the control pulse at output B over line 168. Because the mode selector switch 34 is closed the control pulse is provided to the "off" input of forward drive gate 132 via line 114 thereby turning off gate 132 and stopping motor 64 causing further displacement of blades 142 to be interrupted. The control pulse on line 168 is also simultaneously transmitted over line 183 and actuates the previously enabled flash firing network 180 which fires the strobe unit 30 over line 184 to expose the film unit. Network 180 also actuates flash time out network 188 which after the previously noted delay provides the exposure terminating signal over line 176 which turns off gate 132 via line 144 and turns on gate 134 via line 148. The motor 64 is driven in the reverse sequence and drives the blades 142 toward the closed position. When the blades 142 reach the closed step position the second comparator subcircuit provides the previously described control signal over line 172 which turns off reverse drive gate 134. It will be noted that the light integrating network 192 continues in its light integration mode after actuation and alternatively, it may provide its trigger signal, before flash time out network 188, causing the blades 144 to be driven to the closed position following the actuation of strobe unit 30.

Although not shown in the drawings the system illustrated in FIG. 6 includes additional networks known to those skilled in the art for clearing and resetting the various previously described electronic components circuits and networks. The clearing and reset operation may take place at the end of the exposure cycle or it may precede the next cycle.

The electronic control system shown in FIG. 6 is but one illustration of a control network to perform the enumerated exposure control functions in the described sequences. Those skilled in the art will recognize that other control network elements may be used to perform the same functions without departing from the scope of the invention herein involved. In any event, there has been described herein a multiple mode exposure control system wherein simply constructed and easily operated mode selecting means (switches 112 and 34 in their various combinations of settings) have been provided to program the control network of exposure control 10 in at least two ambient illumination modes (automatic switch 112 open switch 34 open; and semiautomatic switch 112 open switch 34 closed) and at least two flash illumination modes (incandescent lamp flash switch 112 closed, switch 34 open; and strobe flash switch 112 closed and switch 34 closed).

Since certain changes may be made in the above described exposure control system without departing from the scope and spirit of the invention herein involved, the foregoing description and drawings shall be interpreted as being illustrative and not in a limiting sense.

What is claimed is:

1. A photographic exposure control system, selectively operable in a plurality of ambient illumination modes and a plurality of flash illumination modes, for regulating the transmission of light along an optical path, said system comprising:
    a plurality of blade members mounted for displacement between a closed position wherein they block said optical path and a fully open position wherein they unblock said optical path, said blade members providing progressively changing exposure aperture values in response to progressive displacement thereof;
    means for driving said blade members between said open and closed position in a given number of discrete steps and for interrupting displacement of said blade members;
    means for receiving a source of flash illumination;
    means for firing the flash source;
    means for controlling said drive means and said flash firing means and programmable for an automatic ambient mode wherein exposure aperture value is automatically set in accordance with scene lighting conditions, a semi-automatic ambient mode wherein exposure aperture value is manually set by the operator, an incandescent lamp flash mode wherein said blade members continue to open after flash firing and exposure aperture value is set in accordance with scene lighting conditions and a strobe flash mode wherein said blade members are stopped for strobe firing at a preselected scene range related step to set exposure aperture value; and
    mode selecting means for programming said control means including a first selector normally set in an ambient mode programming state and responsive to coupling a flash source to said receiving means for switching said control means to a flash mode programming state and a second selector manually switchable between first and second programming states for, respectively, programming said control means for said automatic or semiautomatic mode when said control means is set for ambient mode operation and for, respectively, programming said control means for said incandescent lamp or strobe flash mode when said control means is set for flash mode operation.

2. The exposure control system of claim 1 wherein said control means includes adjustable aperture selecting means and further including an adjustable focus objective lens through which image forming light rays are transmitted along said optical path and wherein said adjustable aperture selecting means is coupled to said lens in follow focus relation in said incandescent lamp and strobe flash modes so that said adjustable aperture selecting means is set automatically to select the proper range related exposure aperture value range in response to focusing said lens.

3. The exposure control system of claim 2 wherein said adjustable aperture selecting means is uncoupled from said lens in said semiautomatic ambient illumination mode so as to be manually adjustable by the operator independently of lens focusing so as to select a range of exposure aperture values that may be different from a range that would be selected automatically by the follow focus coupling.

4. The exposure control system of claim 3 wherein said adjustable aperture selecting means includes a fixedly positioned sensor and a Gray code disk mounted for rotation about a disk axis and cooperating with said sensor for providing aperture selecting signals that vary with predetermined angular displacement of said disk relative to said sensor and said system further includes a lens focus wheel coupled to said objective lens and mounted for rotation about said disk axis and latch means for coupling said disk and focus wheel together for follow focus operation or uncoupling said disk and focus wheel so that said disk may be rotated independently of said focus wheel to select an aperture not related to lens focus distance.

5. The exposure control system of claim 4 wherein said control means further includes means for providing an exposure termination signal to said drive means when said blade members are at a step defining an aperture selected by said Gray code disk and said second mode selector is effective to block transmission of said termination signal when set in said first programming state and to unblock such transmission when set in said second programming state.

* * * * *